(12) United States Patent
Callen

(10) Patent No.: X2952
(45) Date of Patent: May 4, 1818

(54) MAGNESIA, MEDICATED, LIQUID

(76) Inventor: John Callen

John Cullen of

Letters Patent.

The Schedule referred to in these Letters Patent & making part of the
same, containing a description in the words of the said John Cullen
himself of his improvements in medicine, called Medicated Liquid
Magnesia.

I take the Carbonate of Magnesia of commerce,
mix it with pure water, & reduce it to an impalpable powder, I then
permit the magnesia to subside, and decant the water in which any
of its impurities may have been dissolved. I also wash the magnesia
in a manner similar to that which is employed for the purpose of
separating the fine from the course particles of powdered substances,
for instance chalk and other articles: to this however, I lay no claim
as to invention, but consider it as the most proper mode of preparing
Magnesia Having freed the magnesia of its impurities, I
proceed to its solution, and add to the magnesia water, in which dou
-ble refined sugar has been dissolved - regulating the proportion to the
strength and palatability of the medicine: any other saccharine sub
-stance may be substituted for the sugar. I then put in the magnesia,
sugar, water, and a small quantity of infusion of celery seed, corin
-der (or any other aromatic that will render it palatable, or increase
the stomachic properties) into a copper vessel similar to those used in
the preparation of Seltzer, and other mineral water. Into the aforesaid
copper vessel, which contains the abovementioned articles, I force (by means
of a forcing pump) Carbonic acid gas, (or fixed air) in sufficient quan
-tity to dissolve the magnesia, and thereby give the solution an agreeable
taste, transparent appearance, and more effective properties than the
magnesia possessed in a solid state. It is to be understood, that the ma
-chinery used (for the manufacture of this solution) is exactly similar to
that employed in impregnating artificial mineral waters, to wit, A vessel in which the gas is generated, a gasometer, which is a reservoir of the
gas, a pump constructed on the common plan, which forces the gas into
the Copper vessel, which contains the magnesia, sugar, celery seed, or any
other aromatic that I may deem expedient to make use of. I general
=ly add to the solution either carbonate of potass or soda, but leave
these entirely to circumstances. The medicated solution of Magnesia
may be flavored with various substances without injury to its ant-
=acid or aperient properties. The solution may be prepared without
the addition of sugar or aromatics, and may be condensed into a form
more convenient for transportation -.

Witnesses
[illegible] Wm Elliot
Benjamin [illegible]

John Cullen

Received & Recorded this 13th day of September 1851.
Thos [illegible]
[illegible]